United States Patent
Blount et al.

(10) Patent No.: US 7,349,505 B2
(45) Date of Patent: Mar. 25, 2008

(54) RELAYED COMMUNICATION WITH VERSATILE SELF-INTERFERENCE CANCELLATION

(75) Inventors: Richard Blount, Vista, CA (US); Mark Miller, Encinitas, CA (US); James Murphy, Liburn, GA (US)

(73) Assignee: ViaSat, Inc., Carlsbad, CA (US)

( * ) Notice: Subject to any disclaimer, the term of this patent is extended or adjusted under 35 U.S.C. 154(b) by 463 days.

(21) Appl. No.: 11/090,966

(22) Filed: Mar. 25, 2005

(65) Prior Publication Data

US 2005/0190870 A1    Sep. 1, 2005

Related U.S. Application Data

(63) Continuation of application No. 09/925,410, filed on Aug. 8, 2001, now Pat. No. 6,907,093.

(51) Int. Cl.
*H04B 1/10* (2006.01)
(52) U.S. Cl. ............ 375/346; 375/211; 455/63.1; 455/296; 359/111
(58) Field of Classification Search ........... 375/346, 375/211; 455/63.1, 296, 24, 67.3, 278.1, 455/283; 359/111, 161
See application file for complete search history.

(56) References Cited

U.S. PATENT DOCUMENTS

| | | | | |
|---|---|---|---|---|
| 5,596,439 A | * | 1/1997 | Dankberg et al. | 398/35 |
| 5,691,978 A | * | 11/1997 | Kenworthy | 370/278 |
| 6,011,952 A | * | 1/2000 | Dankberg et al. | 455/24 |
| 6,725,017 B2 | * | 4/2004 | Blount et al. | 455/67.13 |
| 6,907,093 B2 | * | 6/2005 | Blount et al. | 375/346 |
| 2002/0197958 A1 | * | 12/2002 | Collins et al. | 455/63 |

* cited by examiner

*Primary Examiner*—Temesghen Ghebretinsae
(74) *Attorney, Agent, or Firm*—Townsend and Townsend and Crew LLP

(57) ABSTRACT

Methods, apparatuses, and systems are presented for providing self-interference cancellation in two-way relayed electromagnetic communication between a first and a second device through a relay station, involving retrofitting existing equipment comprising a transmitter system and a receiver system at the first device by adding a canceler module, providing a version of a modulated near signal as a first non-baseband interface signal from the transmitter system to the canceler module, providing a version of a composite signal as a second non-baseband interface signal from the receiver system to the canceler module, generating a cancellation signal at the canceler module corresponding to a relayed version of the modulated near signal, using the first and the second non-baseband interface signals, applying the cancellation signal at the canceler module to a version of the second non-baseband interface signal, to produce a cancellation-processed signal as a third non-baseband interface signal provided to the receiver system.

18 Claims, 4 Drawing Sheets

RELAYED COMMUNICATION WITH VERSATILE SELF-INTERFERENCE CANCELLATION

CROSS-REFERENCES TO RELATED APPLICATIONS

This application is a continuation application of U.S. application Ser. No. 09/925,410 for METHOD AND APPARATUS FOR RELAYED COMMUNICATION USING BAND-PASS SIGNALS FOR SELF-INTERFERENCE CANCELLATION, filed Aug. 8, 2001, now U.S. Pat. No. 6,907,093 which is related to U.S. application Ser. No. 08/520/868 for SELF-INTERFERENCE CANCELLATION FOR TWO-PARTY RELAYED COMMUNICATION, filed Aug. 1, 1995, now U.S. Pat. No. 5,596,439, issued Jan. 21, 1997 and U.S. application Ser. No. 09/009,573 for SELF-INTERFERENCE CANCELLATION FOR RELAYED COMMUNICATION NETWORKS, filed Jan. 20, 1998, now U.S. Pat. No. 6,011,952, issued Jan. 4, 2000, both of which are owned by the Assignee of the present invention and are herein incorporated by reference for all purposes.

BACKGROUND OF THE INVENTION

This invention relates to a radio frequency or optical communication system in which a relay station is used to aid communication among a network of parties, and more particularly to an improvement allowing more efficient use of the available channel resource.

Self-interference cancellation is a theoretically efficient technique for relayed communication between two or more devices involving the transmission of different signals within the same frequency band at the same time. In the example of communication between two devices, such transmission results in a composite signal that includes two signals, one originating from each device. As each device attempts to receive the signal originating from the other device (far signal), it is hindered by interference caused by the signal originating from itself (near signal). Thus, self-interference cancellation works by generating a cancellation signal resembling the device's own near signal and using the cancellation signal to remove at least a portion of the near signal from the composite signal to obtain a signal closer to the desired far signal.

A number of techniques have been developed for self-interference cancellation. However, these techniques have focused on structures which make it expensive and inconvenient to retrofit the large number of existing systems for the capability of self-interference cancellation. In addition, these techniques have failed to take into account various distortions introduced into the transmit signal. As a result, advantages of self-interference cancellation have not been fully realized.

FIG. 1 depicts an existing satellite communication facility with a transmitter system 100 and a receiver system 101 well known in the prior art with no self-interference cancellation capability. The transmitter system 100 comprises a modulator unit 102 and transmitter equipment 104, and the receiver system 101 comprises receiver equipment 108 and demodulator unit 106. Only one of each of these components is shown here for clarity of illustration. It should be understood that there may be more than one of each component in the satellite communication facility. Typically, the modulator unit 102 contains a modulator 112 receiving a transmit (TX) data signal 110 and producing a TX baseband modulated signal 114. An upconverter 116 receives the TX baseband modulated signal 114 and produces a TX interface signal 118 at or near its designated interface frequency. An interface signal as used herein is the signal at the point where a tap can be made in the signal path. The interface frequency, i.e., the frequency associated with the passband of the interface signal, can be any frequency above baseband, namely at a passband such as associated with an Intermediate Frequency (IF) (typically 70 MHz to 2 GHz) or a Radio Frequency (RF) (typically 400 MHz to 30 GHz). An RF frequency is the frequency of signal emission and the IF frequency is typically the frequency of a signal at some location between the baseband processing stage and the signal emission stage. The modulator 102 may produce the TX interface signal 118 using a different method, such as modulating and upconverting all in one step. (Modulating is the process of applying information to a signal.) Typically, the TX interface signal 118, operating at or near the interface frequency, is sent from the modulator unit 102 to a transmitter equipment 104 through a coaxial cable. The transmitter equipment 104 further processes the TX interface signal 118 before transmission to a satellite or other relay station (not shown).

The radio receiver equipment 108 receives a signal from the satellite or other relay station and produces a receive (RX) interface signal 120 at or around an interface frequency. The interface frequency for the receive signal can be the same as or different than the TX interface frequency. Typically, the RX interface signal 120 is sent from the radio receive equipment 108 to the demodulator unit 106 through a coaxial cable. A downconverter 122 aboard the demodulator unit 106 receives the RX interface signal 120 and produces an RX baseband modulated signal 124. A demodulator 126 receives the RX baseband modulated signal 124 and produces an RX data signal 128.

Retrofitting a facility such as an existing satellite communication facility for self-interference cancellation capability has been expensive and inconvenient because current techniques of self-interference cancellation have all focused on structures that require the construction of completely new systems or require tapping into existing systems at inconvenient and/or difficult-to-access locations. For example, a number of these techniques have relied on tapping into the transmit path at the data signal stage for purposes of generating the cancellation signal. Tapping the TX data signal 110 may be impracticable. The TX data signal 110 may be a signal internal to the modulator unit 102. Self-interference cancellation techniques that tap at the output of the modulated signal suffer the same problem. Here, TX baseband modulated signal 114 may also be internal to the modulator unit 102. Efforts to tap such signals may require modifications to circuit boards or other reconfigurations that, if possible at all, are costly and inefficient. Especially given the large amount of relayed communication facility equipment already in service around the world today and the prohibitive expense involved in replacing such equipment or modifying equipment in sealed or otherwise inaccessible enclosures, application of current techniques to retrofit existing equipment for self-interference cancellation capability may be impractical.

In addition, current techniques for self-interference cancellation fail to take into account distortions introduced into the transmit signal. For example, current techniques that do not tap any signals sourced from the transmitter system 100 or tap either the TX data signal 110 or the TX baseband modulated signal 114 simply ignore certain induced distortions such as non-linearity or local oscillation (LO) feedthrough. As a result, the potential advantages of self-interference cancellation techniques and performance of self-interference cancellation systems have not been fully realized. The prior art approaches are illustrated by U.S. Pat. No. 5,280,537 issued Jan. 18, 1994 to Jugiyama et al. and assigned to Nippon Telegraph and Telephone Corporation, U.S. Pat. No. 5,625,640 issued Apr. 29, 1997 to Palmer et al. and assigned to Hughes Electronics, and U.S. Pat. No. 5,860,057 issued Jan. 12, 1999 to Ishida et al. and assigned to Hitachi, Ltd.

BRIEF SUMMARY OF THE INVENTION

The present invention relates to methods, apparatuses, and systems for providing self-interference cancellation in two-way relayed electromagnetic communication between a first device and a second device through a relay station. The first device is capable of transmitting a modulated near signal and receiving a composite signal containing a relayed version of the modulated near signal a relayed version of a modulated far signal transmitted from the second device. The invention involves retrofitting existing equipment at the first device by adding a canceler module, wherein the existing equipment comprises a transmitter system and a receiver system, providing a version of the modulated near signal as a first non-baseband interface signal from the transmitter system to the canceler module, providing a version of the composite signal as a second non-baseband interface signal from the receiver system to the canceler module, generating a cancellation signal at the canceler module corresponding to the relayed version of the modulated near signal, using the first non-baseband interface signal and the second non-baseband interface signal, applying the cancellation signal at the canceler module to a version of the second non-baseband interface signal, to produce a cancellation-processed signal as a third non-baseband interface signal from the canceler module, and providing the cancellation-processed signal to the receiver system.

The first non-baseband interface signal may be provided from the transmitter system by tapping the transmitter system at a signal connector. The second non-baseband interface signal may be provided from the receiver system by tapping the receiver system at a signal connector. The third non-baseband interface signal may be provided to the receiver system at a signal connector.

In one embodiment of the invention, the first non-baseband interface signal, second non-baseband interface signal, and third non-baseband interface signal are interface frequency (IF) signals. In another embodiment of the invention, the first non-baseband interface signal, second non-baseband interface signal, and third non-baseband interface signal are radio frequency (RF) signals. The generated cancellation signal may take into account distortions introduced by the transmit system.

The canceler module may generate a time-delayed and phase-rotated signal in producing the cancellation signal. The canceler module may adaptively filter the time-delayed and phase-rotated signal to produce the cancellation signal. The canceler module may utilize the cancellation-processed signal as a feedback signal to adaptively filter the time-delayed and phase rotated signal.

DETAILED DESCRIPTION OF THE INVENTION

Figure 2:
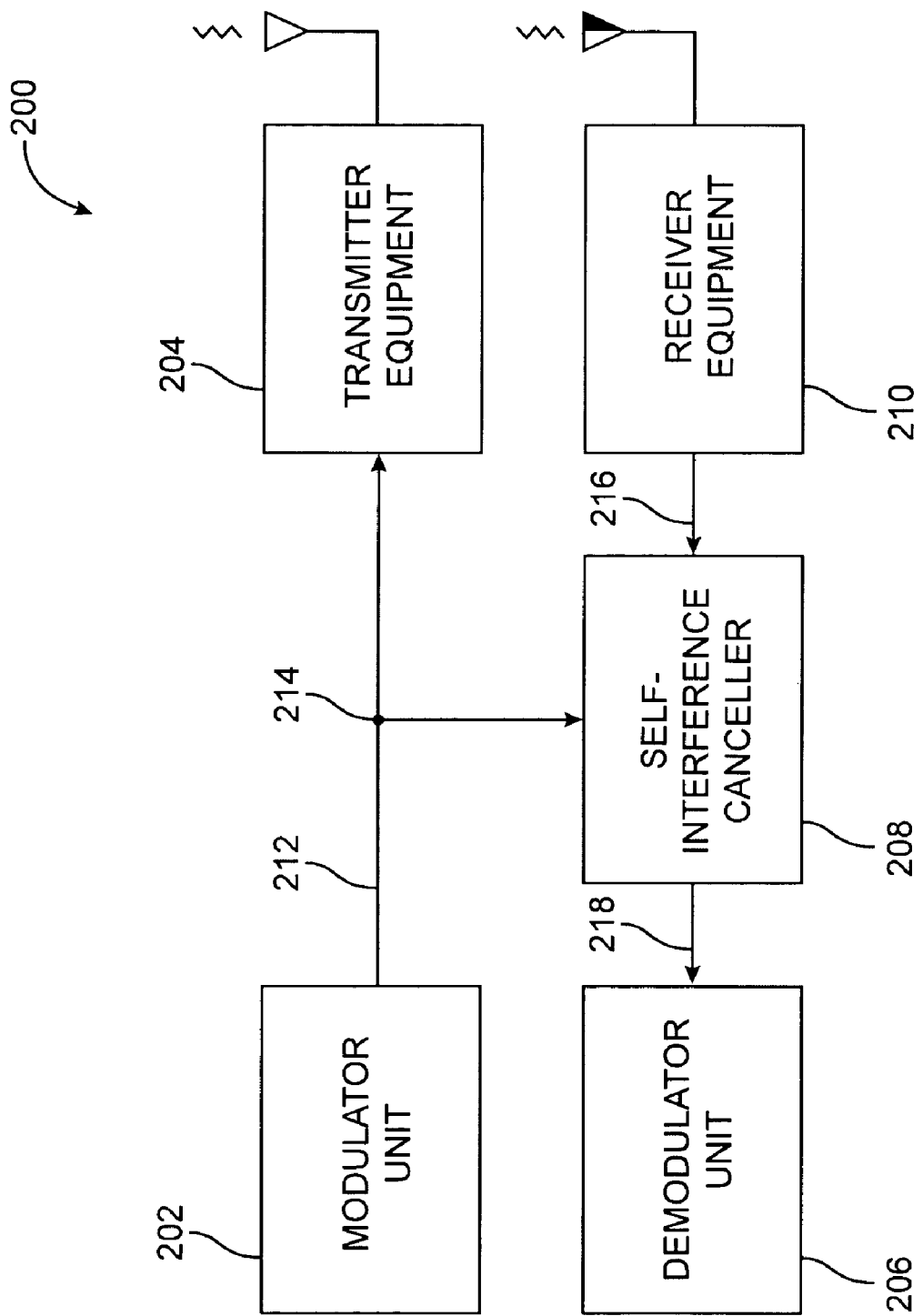
FIG. 2 illustrates an embodiment of a versatile self-interference cancellation system of the present invention.

FIG. 2 illustrates an embodiment of a versatile self-interference cancellation system 200 of the present invention. The self-interference cancellation system 200 comprises a modulator unit 202, transmitter equipment 204, a demodulator unit 206, a self-interference canceler 208, and receiver equipment 210.

On the transmit side, the modulator unit 202 provides a TX interface signal 212 via an accessible feed line (typically coaxial) to the transmitter equipment 204. The TX interface signal 212 is a representation of the locally modulated signal which is also called the near signal. This representation is at or near an interface frequency that is not baseband. The transmitter equipment 204 can be any equipment along the transmit path, such as an upconverter, mixer, splitter, combiner, splitter/combiner, amplifier, antenna, or the like. A signal splitter 214 in the TX interface signal line allows the TX interface signal 212 to be easily tapped for purposes of self-interference cancellation according to the invention.

On the receive side, the receiver equipment 210 provides an RX interface signal 216 to a self-interference canceler 208. The RX interface signal 216 is a representation of the composite signal, which is composed of two components, the relayed version of the near signal and the relayed version of the far signal. This representation is at or near an interface frequency that is not baseband. The frequency may differ from that of the TX interface signal 212. The receiver equipment 210 can be any equipment along the receive path, such as an up-converter, mixer, splitter, combiner, splitter/combiner, amplifier, antenna, or the like. The self-interface canceler 208 uses the TX interface signal 212 tapped from the TX interface signal line to perform self-interference cancellation on the RX interface signal 216 and provides a cancellation-processed RX interface signal 218 to the demodulation unit 206.

Figure 1:
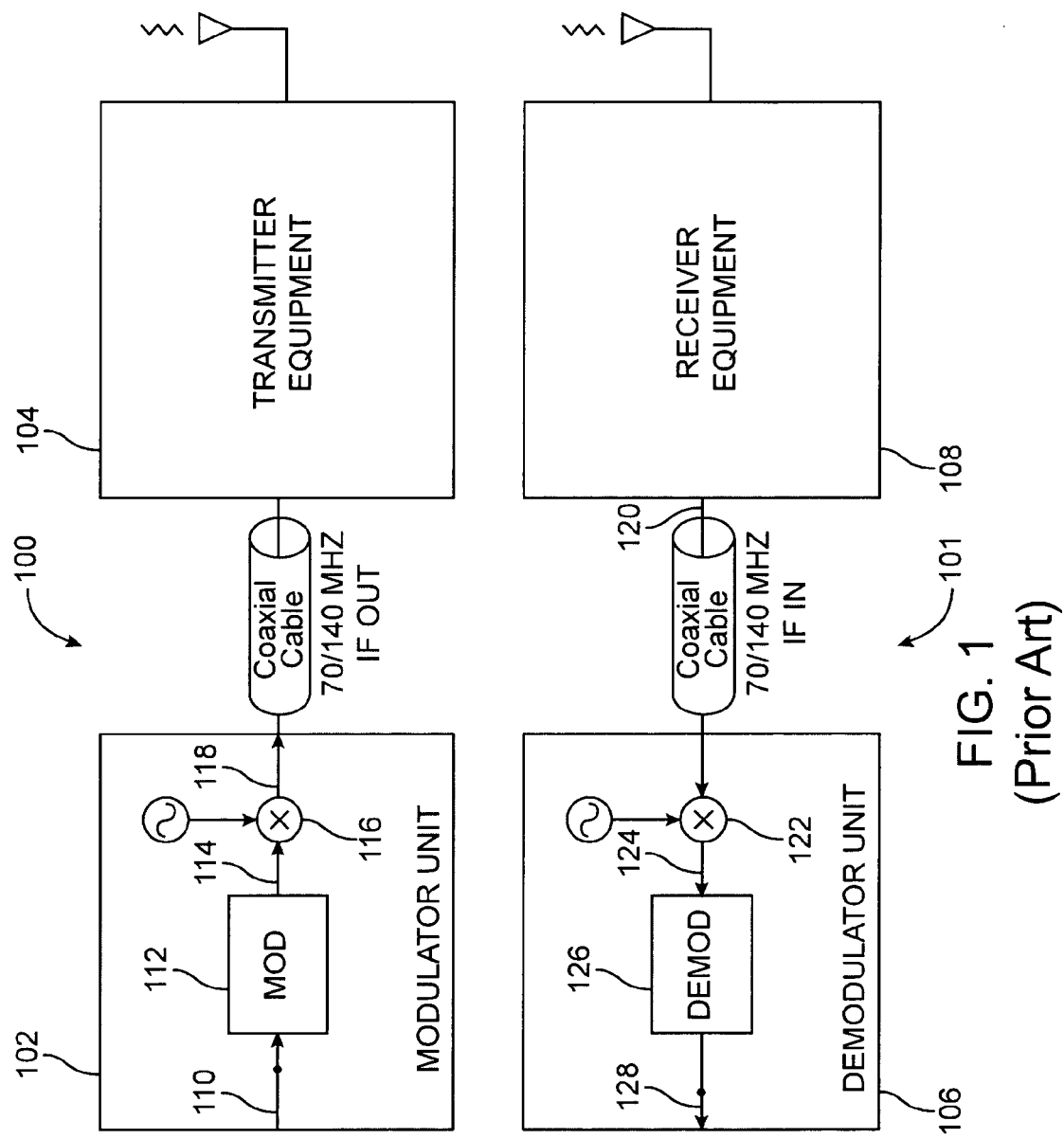
FIG. 1 depicts known elements of a satellite communication facility with no self-interference capability.

This configuration allows convenient and cost-effective retrofitting of existing equipment for self-interference cancellation. Typically, an existing satellite communication facility that lacks self-interference capability, such as the one shown in FIG. 1, already contains the modulator unit 202, the transmitter equipment 204, the demodulator unit 206, and the receiver equipment 210. According to the invention, retrofitting of the existing facility for self-interference capability involves simple insertion of the self-interference canceler 208 along the path of the RX interface signal 216 between the receiver equipment 210 and the demodulator unit 206, and tapping the TX interface signal 212 using the splitter 214 and employing as the self-interference canceler 208 a function which is tailored to the signal characteristics to be canceled as hereinafter described.

Figures 3, 4:
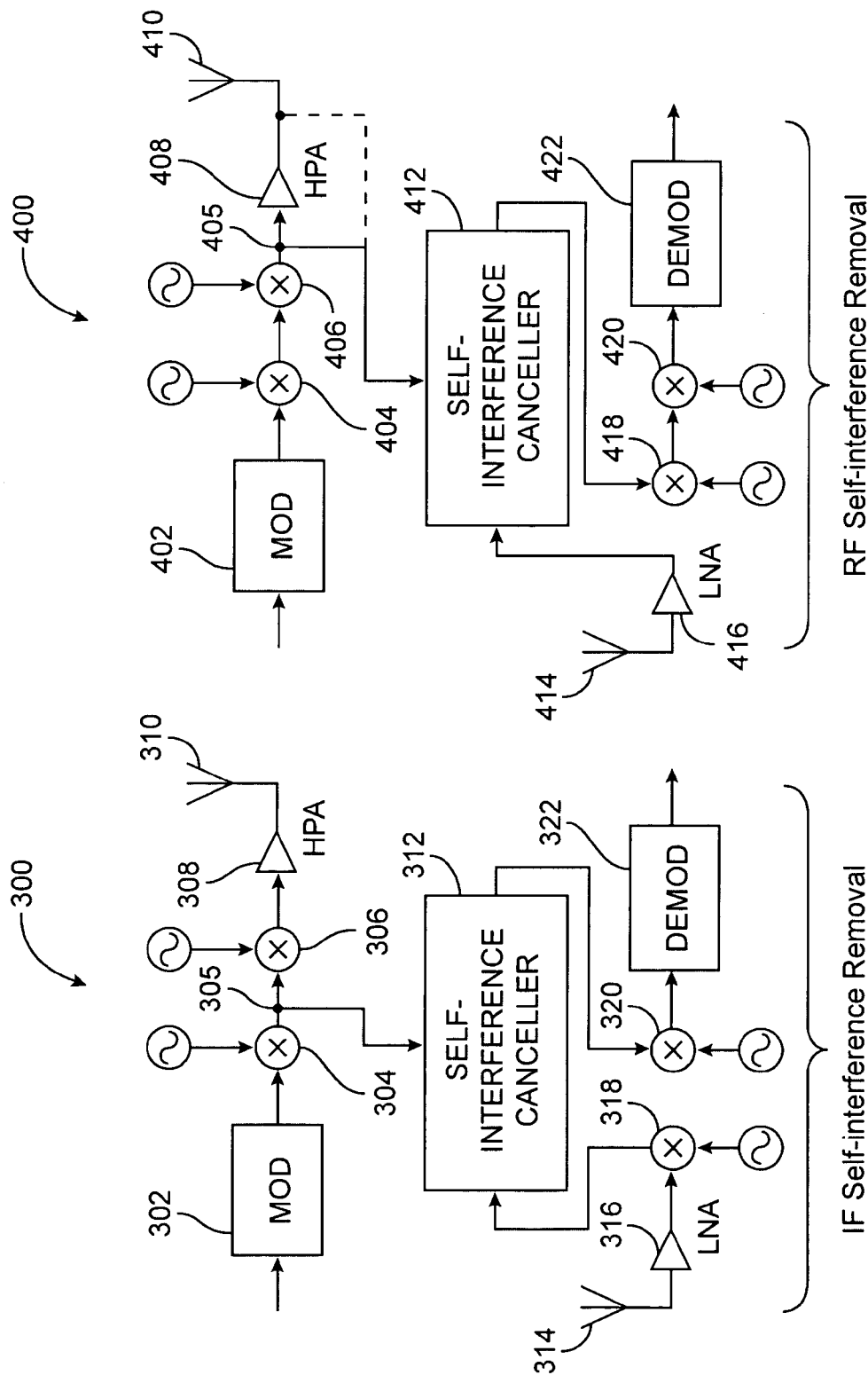
FIG. 3 is a functional diagram of a first example of the versatile self-interference cancellation system in FIG. 2.
FIG. 4 is a functional diagram of a second example of the versatile self-interference cancellation system in FIG. 2.

FIG. 3 is a functional diagram of a first example 300 of the versatile self-interference cancellation system according to the invention. A modulator 302 receives a TX data signal and produces a TX baseband modulated signal, which is provided to a first upconverter (or mixer) 304. The first upconverter 304 produces a TX intermediate frequency (IF)

bandpass signal at or near an IF frequency in a passband, which is provided to a second upconverter 306 (or mixer). The second upconverter 306 produces a TX radio frequency (RF) signal at or near an RF frequency. The TX RF signal is provided to a high power amplifier (HPA) 308, which produces a TX amplified RF signal that is provided to a transmit antenna 310 and transmitted toward the relay element (not shown). The transmit antenna 310 can be a parabolic reflector of other type of directional antenna.

The signal received at the receive antenna 314 is provided to a low noise amplifier (LNA) 316. The receive antenna 314 may be the same device as the transmit antenna 310 or a different device, and likewise the receive antenna 314 may be a parabolic reflector or other type of antenna. The LNA 316 provides an amplified RX RF signal to a first downconverter (or mixer) 318. The downconverter 318 provides an RX IF signal in a passband to an interference canceler 312. The TX IF signal from the first upconverter 304 is also provided to the interference canceler 312. The interference canceler 312 provides a cancellation-processed RX IF signal in a passband to a second downconverter (or mixer) 320. The second downconverter 320 provides an RX baseband signal to a demodulator 322, which produces an RX data signal.

In the example 300, the self-interference canceler 312 is able to take into account non-linearities, LO feed-through, and other distortions introduced by the modulator 302 and the first upconverter 304 because the interference canceler 312 takes as its input the TX IF signal that contains such distortions. In addition, retrofitting an existing facility for self-interference cancellation is made more convenient and practical. The cancellation signal is generated by tapping into the transmit path at the IF passband. Since the output of the upconverter 304 of a transmitter of interest has an easily accessible connector, and a self-interference canceler 312 of interest has readily accessible IF_signal inputs and outputs (input from the first downconverter 318, input from the first upconverter 304, and output to the second downconverter 320), such retrofit is easily accomplished by adding a signal splitter 305 and coaxial connectors and cables to tap the existing IF signal paths. This is a task easily performed by a technician.

FIG. 4 is a functional diagram of a second example 400 of the self-interference cancellation system according to the invention. A modulator 402 receives a TX data signal and produces a TX baseband modulated signal, which is provided to a first upconverter (or mixer) 404. The first upconverter 404 produces a TX intermediate frequency (IF) bandpass signal at or near an IF frequency in a passband, which is provided to a second upconverter 406 (or mixer). The second upconverter 406 produces a TX radio frequency (RF) signal at or near an RF frequency. The TX RF signal is provided to a high power amplifier (HPA) 408, which produces a TX amplified RF signal that is provided to a transmit antenna 410 and transmitted toward the relay element.

The signal received at the receive antenna 414 is provided to a low noise amplifier (LNA) 416. The receive antenna 414 can be the same device as the transmit antenna 410 or a different device. The LNA 416 provides an amplified RX RF signal to an interference canceler 412. The TX RF signal from the second upconverter 406 is also provided to the interference canceler 412. The interference canceler 412 provides a self-cancellation processed RX RF signal to a first downconverter (or mixer) 418. The first downconverter 418 provides an RX IF signal to a second downconverter (or mixer) 420. The second downconverter 420 provides an RX baseband modulated signal to a demodulator 422, which produces an RX data signal.

In the example 400, the self-interference canceler 412 takes into account non-linearities, LO feed-through, and other distortions introduced by the modulator 402 and the first upconverter 404 and the second upconverter 406 because the interference canceler takes as its input the TX IF signal that contains such distortions. In addition, retrofitting an existing facility for self-interference cancellation is made more convenient and practical. The cancellation signal is generated by tapping into the transmit path at the IF passband. Since the output of the second upconverter 406 of a transmitter of interest has an easily accessible connector, and a self-interference canceler 412 of interest has readily accessible IF signal inputs and outputs (input from the second upconverter 406, input from the low-noise amplifier (LNA) 416, and output to the first downconverter 418), such retrofit is easily accomplished by adding a signal splitter 405 and coaxial connectors and cables to tap the existing RF signal paths. This is a task easily performed by a technician.

Alternatively, the TX amplified RF signal produced by HPA 408, instead of the TX RF signal from the second upconverter 406, is provided to the self-interference canceler 412. By tapping the transmit signal after the HPA 408, the self-interference canceler 412 is able to also take into account non-linearities and other distortions introduced to the transmit signal by the HPA 408. Here, attention may be required to carefully attenuate the TX RF signal before providing it to the self-interference canceler 414, without disturbing the TX amplified RF signal provided to the transmit antenna 410.

Figure 5:
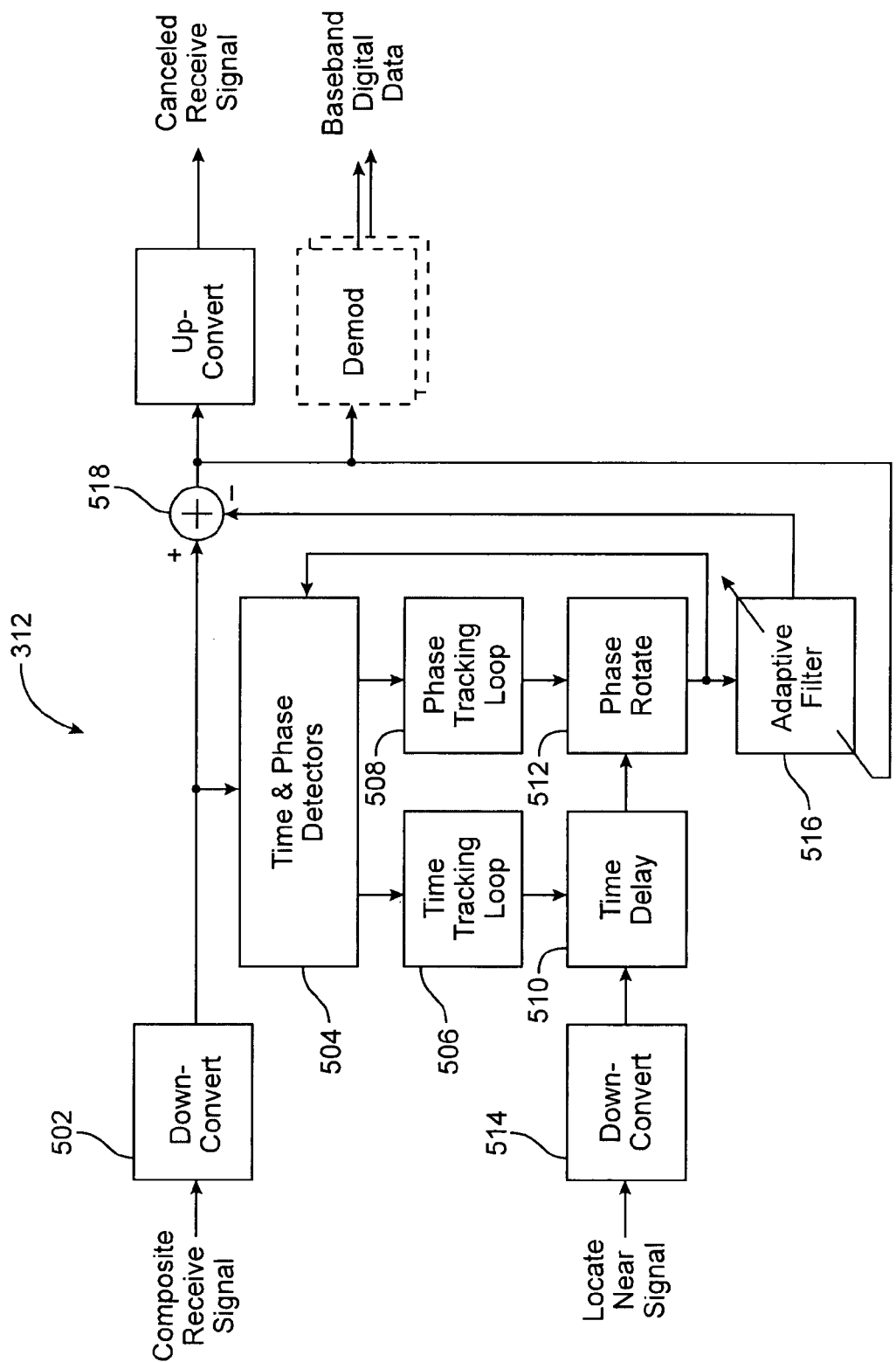
FIG. 5 is a detailed block diagram of the self-interference canceler in FIG. 3.

FIG. 5 is a detailed block diagram of one possible embodiment of a self-interference canceler 312 of FIG. 3. (The self-interference canceler 412 in FIG. 4 may have a similar structure.) The composite received signal, in the form of the RX IF signal (or the RX RF signal in the case of the self-interference canceler 412), is down-converted to baseband at a downconverter block 502. The downconverter block 502 may be implemented in a variety of ways, such as in a single stage or in multiple stages and by analog or digital methods. This baseband signal is input to a time and phase detectors block 504. A time-delayed and phase-rotated local near signal is also input to the time and phase detector block 504. The time and phase detectors block 504, which may comprise a single device or separate devices, performs correlation function(s) on its inputs and produces outputs that drive a time tracking loop block 506 and a phase tracking loop block 508.

The time-delayed and phase-rotated local near signal is generated from the local near signal as herein explained. The local near signal, in the form of the TX IF signal (or the TX RF signal in the case of the self-interference canceler 412), is down-converted at a downconverter block 514. The down-converted local near signal is time-delayed by the time delay block 510, which is under the control of the time tracking loop block 506. The time-delayed signal is then phase-rotated by the phase rotation block 512, which is under the control of the phase tracking loop block 508. The phase rotation is capable of removing frequency differences between the local near signal and the received near component of the composite received signal. The order of time delay and phase rotation can be changed with departing from the scope or spirit of the invention. However, phase rotation should preferably occur after time delay to mitigate against distortion.

Once the local near signal has been aligned in frequency, time and phase to the received near signal, the resulting signal must still be adjusted to compensate for channel and relay effects. An adaptive filter 516 does this adjustment. The adaptive filter 516 can be as simple as a single tap finite impulse response filter to adjust the amplitude of the local near signal to the received near signal. On the other extreme, the adaptive tilter 516 may be highly complex and non-linear, for example to mimic the effects of a saturated non-linear amplifier in a satellite transponder. The complexity of the filter will be determined by the combination of the complexity of the channel and the interference suppression requirement of the application. The order of adaptive filter, time delay, and phase rotation may be changed.

The output of the adaptive filter 516 is an estimate of the received near component of the composite received signal. To remove the received near component, this estimate is subtracted from the baseband composite received signal at a subtraction block 518. The output of the subtraction block is provided as an error signal to the adaptive algorithm and is also up-converted back to the original IF frequency (or RF frequency in the case self-interference canceler 412) that was input to the canceler. Alternatively or additionally, this signal can be directly demodulated to extract the desired signal (or signals) using one or more demodulator(s).

Although not shown in FIG. 5, a delay block may be introduced in path 520 to introduce a delay in the baseband composite received signal to take into account time delay spread of the channel.

FIG. 5 is only one embodiment of a self-interference canceler. Other self-interference cancelers may be used if adapted to process signals in accordance with the invention. Other derivations of the present self-interference canceler may be made in which the local near signal may be modified by a variable delay, a phase rotator and an adaptive filter. This embodiment is generally preferable, since the local near signal does not carry the noise and additional signal components of the composite signal. Alternate embodiments, however, would include systems in which the composite received signal is variably delayed, phase rotated, and/or adaptively filtered.

The self-interference cancellation system of the present invention is modulation independent and will correct a wide range of signal impairments, both linear and non-linear. The system is suited for a wide variety of implementations, including retrofit into existing satellite communication facilities.

Although the present invention has been described in terms of specific embodiments, it should be apparent to those skilled in the art that the scope of the present invention is not limited to the described specific embodiments.

The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for providing self-interference cancellation in two-way relayed electromagnetic communication between a first device and a second device through a relay station, the first device being capable of transmitting a modulated near signal and receiving a composite signal containing a relayed version of the modulated near signal a relayed version of a modulated far signal transmitted from the second device, the method comprising the steps of:

retrofitting existing equipment at the first device by adding a canceler module, wherein the existing equipment comprises a transmitter system and a receiver system;

providing a version of the modulated near signal as a first non-baseband interface signal from the transmitter system to the canceler module;

providing a version of the composite signal as a second non-baseband interface signal from the receiver system to the canceler module;

at the canceler module, generating a cancellation signal corresponding to the relayed version of the modulated near signal, using the first non-baseband interface signal and the second non-baseband interface signal;

at the canceler module, applying the cancellation signal to a version of the second non-baseband interface signal, to produce a cancellation-processed signal as a third non-baseband interface signal from the canceler module;

providing the cancellation-processed signal to the receiver system; and wherein the canceler module generates a time-delayed and phase-rotated signal in producing the cancellation signal.

2. The method of claim 1 wherein the first non-baseband interface signal is provided from the transmitter system by tapping the transmitter system at a signal connector.

3. The method of claim 1 wherein the second non-baseband interface signal is provided from the receiver system by tapping the receiver system at a signal connector.

4. The method of claim 1 wherein the third non-baseband interface signal is provided to the receiver system at a signal connector.

5. The method of claim 1 wherein the first non-baseband interface signal, second non-baseband interface signal, and third non-baseband interface signal are interface frequency (IF) signals.

6. The method of claim 1 wherein the first non-baseband interface signal, second non-baseband interface signal, and third non-baseband interface signal are radio frequency (RF) signals.

7. The method of claim 1 wherein the generated cancellation signal takes into account distortions introduced by the transmit system.

8. The method of claim 1 wherein the canceler module adaptively filters the time-delayed and phase-rotated signal to produce the cancellation signal.

9. The method of claim 8 wherein the canceler module utilizes the cancellation-processed signal as a feedback signal to adaptively filter the time-delayed and phase rotated signal.

10. An apparatus for providing self-interference cancellation in two-way relayed electromagnetic communication between a first device and a second device through a relay station, the first device being capable of transmitting a modulated near signal and receiving a composite signal containing a relayed version of the modulated near signal a relayed version of a modulated far signal transmitted from the second device, the apparatus comprising:

a canceler module capable of being added to existing equipment at the first device to retrofit the existing equipment, the existing equipment comprising a transmitter system and a receiver system;

wherein the transmitter system is capable of providing a version of the modulated near signal as a first non-baseband interface signal to the canceler module;

wherein the receiver system is capable of providing a version of the composite signal as a second non-baseband interface signal to the canceler module;

wherein the canceler module is adapted to generate a cancellation signal corresponding to the relayed version of the modulated near signal, using the first non-baseband interface signal and the second non-baseband interface signal;

wherein the canceler module is further adapted to apply the cancellation signal to a version of the second non-baseband interface signal, to produce a cancellation-processed signal as a third non-baseband interface signal from the canceler module;

wherein the canceler module is capable of providing the cancellation-processed signal to the receiver system; and wherein the canceler module is adapted to generate a time-delayed and phase-rotated signal in producing the cancellation signal.

11. The apparatus of claim 10 wherein the transmitter system is capable of being tapped at a signal connector to provide the first non-baseband interface signal.

12. The apparatus of claim 10 wherein the receiver system is capable of being tapped at a signal connector to provide the second non-baseband interface signal.

13. The apparatus of claim 10 wherein the receiver system is capable of receiving the third non-baseband interface signal at a signal connector.

14. The apparatus of claim 10 wherein the first non-baseband interface signal, second non-baseband interface signal, and third non-baseband interface signal are interface frequency (IF) signals.

15. The apparatus of claim 10 wherein the first non-baseband interface signal, second non-baseband interface signal, and third non-baseband interface signal are radio frequency (RF) signals.

16. The apparatus of claim 10 wherein the generated cancellation signal takes into account distortions introduced by the transmit system.

17. The apparatus of claim 10 wherein the canceler module is capable of adaptively filtering the time-delayed and phase-rotated signal to produce the cancellation signal.

18. The apparatus of claim 17 wherein the canceler module is capable of utilizing the cancellation-processed signal as a feedback signal to adaptively filter the time-delayed and phase rotated signal.

* * * * *